US009036954B2

(12) United States Patent
Kobrinsky et al.

(10) Patent No.: US 9,036,954 B2
(45) Date of Patent: May 19, 2015

(54) OPTICAL WAVEGUIDE STRUCTURE

(75) Inventors: Mauro J. Kobrinsky, Portland, OR (US); Bruce A. Block, Portland, OR (US); Peter L. Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 922 days.

(21) Appl. No.: 13/078,210

(22) Filed: Apr. 1, 2011

(65) Prior Publication Data

US 2012/0251029 A1    Oct. 4, 2012

(51) Int. Cl.
| | | |
|---|---|---|
| *G02F 1/035* | (2006.01) | |
| *G02F 1/025* | (2006.01) | |
| *G02F 1/065* | (2006.01) | |
| *G02F 1/225* | (2006.01) | |

(52) U.S. Cl.
CPC ............... *G02F 1/035* (2013.01); *G02F 1/025* (2013.01); *G02F 1/065* (2013.01); *G02F 1/225* (2013.01); *G02F 2201/18* (2013.01)

(58) Field of Classification Search
CPC .................................................. G01D 5/35329
See application file for complete search history.

(56) References Cited

U.S. PATENT DOCUMENTS

| | | | |
|---|---|---|---|
| 6,128,424 A | 10/2000 | Gampp et al. | |
| 6,204,951 B1 * | 3/2001 | Coward et al. | 359/245 |
| 7,088,875 B2 * | 8/2006 | Sugiyama et al. | 385/3 |
| 7,382,942 B2 * | 6/2008 | Mitomi et al. | 385/2 |
| 7,426,326 B2 * | 9/2008 | Moeller et al. | 385/40 |
| 7,603,002 B2 * | 10/2009 | Sugiyama | 385/3 |
| 7,995,872 B2 * | 8/2011 | Aoki et al. | 385/2 |
| 8,068,874 B2 * | 11/2011 | Kuwahara et al. | 455/561 |
| 8,346,025 B2 * | 1/2013 | Gill | 385/3 |
| 2003/0138180 A1 | 7/2003 | Kondo et al. | |
| 2009/0142015 A1 | 6/2009 | Ide et al. | |

OTHER PUBLICATIONS

International Preliminary Report on Patentability for International Application No. PCT/US2012/031187, dated Oct. 1, 2013, 5 pages.
PCT International Search Report and Written Opinion of the International Searching Authority for Int'l Application No. PCT/US2012/031187, dated Oct. 29, 2012, 9 pages.

\* cited by examiner

*Primary Examiner* — Uyen Chau N Le
*Assistant Examiner* — John M Bedtelyon
(74) *Attorney, Agent, or Firm* — Blakely, Sokoloff, Taylor & Zafman LLP

(57) ABSTRACT

Embodiments of the invention describe a multi-segment optical waveguide that enables an optical modulator to be low-power and athermal by decreasing the device length needed for a given waveguide length. Embodiments of the invention describe an optical waveguide that is folded onto itself, and thus includes at least two sections. Thus, embodiments of the invention may decrease the device size of a modulator by at least around a factor of two if the device is folded twofold (device size may be further reduced if the modulator is folded threefold, four-fold, five-fold, etc.).
Embodiments of the invention further enable the electrode length required to create the desired electro-optic effect for the multi-segment optical waveguide to be reduced. In embodiments of the invention, certain electrodes may be "shared" amongst the different segments of the waveguide, thereby reducing the power requirement and capacitance of a device having a waveguide of a given length.

16 Claims, 6 Drawing Sheets

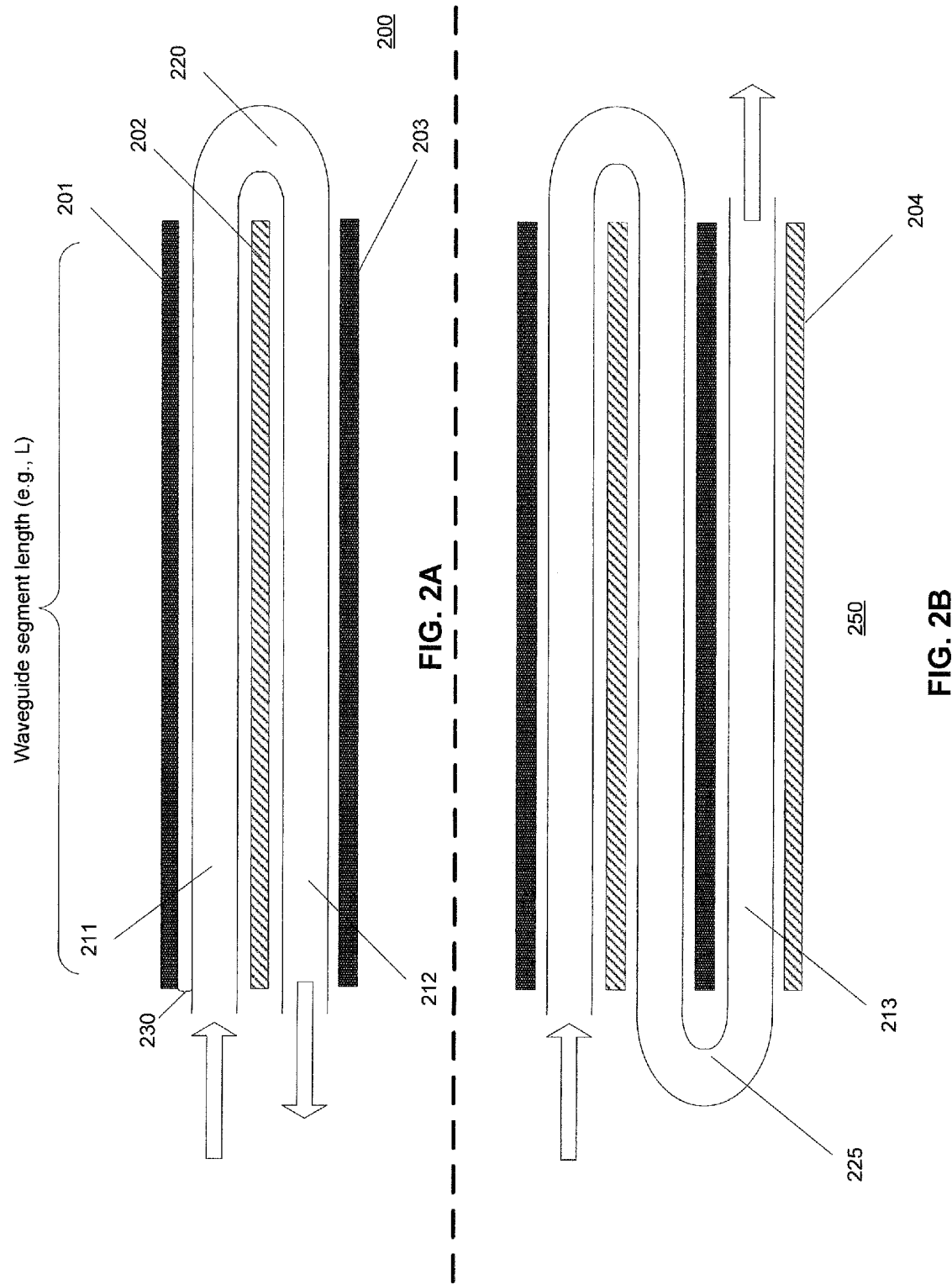

OPTICAL WAVEGUIDE STRUCTURE

FIELD

Embodiments of the invention generally pertain to optical devices and more specifically towards optical waveguide design.

BACKGROUND

The transmission of data via optical systems is performed by imparting information in some manner onto an optical signal. Optical modulators may be used to convert an electrical information carrying signal into an optical modulated signal. Currently, modulators are either athermal (i.e., not affected by changes in operating temperature of the system, which may include modulator and/or light source) and consume high power, or are highly temperature dependent (i.e., readily affected by changes in operating temperature of the system) and consume low power.

FIG. 1 is a diagram of a Mach-Zehnder Interferometer (MZI) as known in the prior art. Modulator 100 includes optical waveguide splitter 110, optical waveguide re-combiner 120, and optical waveguide branches 130 and 140, each branch including optically active material. Electrodes 135 and 145 are associated with waveguide branches 130 and 140, respectively.

Modulator 100 receives light from a light source (e.g., a laser) to optical waveguide splitter 110 in order for the light to travel along branches 130 and 140. The reunited beam exits the modulator at the end of optical waveguide re-combiner 120. An electrical voltage applied to electrodes 135 and 145 provides a phase change in the light propagating through branches 130 and 140 (i.e., the refractive index of the optically active material will change based on the voltage applied to the electrodes).

Thus, when no modulating voltage is applied to either of the electrode sets, light traveling along branches 130 and 140 arrives at re-combiner 120 in-phase. If a voltage is applied to one of the electrode sets, a differential change occurs due to the electro-optic effect, and the signals arrive at re-combiner 120 out of phase. By controlling the modulation voltage to one, or both of the electrode sets, MZI 100 may be operated to convert a continuous wave into a high bit rate modulated signal.

For high frequency performance, the electrodes of the modulators need to be short in device length in order to obtain high-speed due to the total device capacitance. If the electrodes are not sufficiently short, to improve the efficiency of modulation while keeping a high modulation frequency, the light wave and the electrical signal (a radio-frequency electromagnetic wave) may be made to co-propagate in the material. Optoelectronic devices employing co-propagation of light and electrical signals belong to a class known as traveling-wave devices; however, traveling-wave devices consume more power, and the complexity of their structure is not ideal for mass-production.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 2A and FIG. 2B are diagrams of optical waveguides according to an embodiment of the invention.

Figure 1:
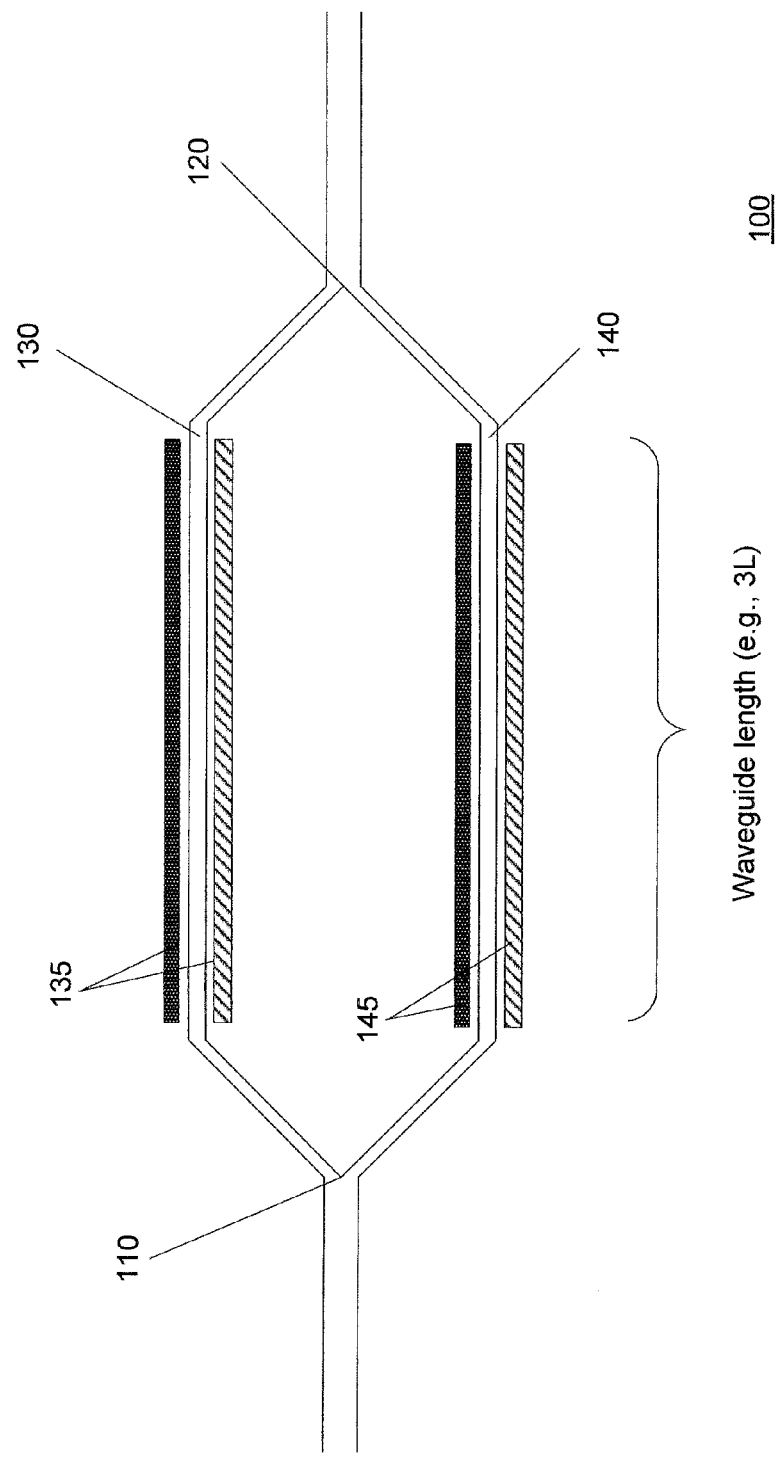
FIG. 1 is a diagram of a prior art Mach-Zehnder Interferometer.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe a multi-segment optical waveguide that enables an optical modulator to be low-power and athermal (i.e., not affected by changes in operating temperature of the system, which may include modulator and/or light source) by decreasing the device length needed for a given waveguide length. Embodiments of the invention describe an optical waveguide, comprising any optically active material known in the art, which is folded onto itself and thus includes at least two sections. Therefore embodiments of the invention may decrease the device length of a modulator by at least around a factor of two if the device is arranged twofold. It will be clear in view of the example embodiments discussed below that optical waveguides according to embodiments of the invention may be arranged threefold, four-fold, five-fold, and so on.

Embodiments of the invention further enable the electrode length required to create the desired electro-optic effect for the multi-segment optical waveguide to be reduced. Furthermore, it will be understood in view of the example embodiments and figures discussed below that electrodes may be "shared" amongst the different segments of the multi-segment optical waveguide, thereby reducing the power requirement and capacitance of a device having a waveguide of a given length.

FIG. 2A and FIG. 2B are diagrams of optical waveguides according to embodiments of the invention. In this example, optical device 200 includes a plurality of electrodes, including electrodes 201, 202 and 203 (i.e., electrode 202 is complementary to electrodes 201 and 203). In this embodiment, said electrodes are relatively parallel with each other. In other embodiments, said electrodes may be aligned in a non-parallel manner. The optically-active material of the waveguide is located between the electrodes and is controlled by the electrodes. As described above, any optically-active material known in the art may be used—e.g., electro-optical polymers (EOPs), ferroelectric oxides (e.g. LiNbO3), piezoelectric materials (e.g. PLTZ), and electro-absorption materials (III-V or Germanium quantum well devices, where an electric signal controls the absorption of light).

It is to be understood that optical waveguides according to embodiments of the invention are formed by at least two materials: core and cladding materials (see, e.g., cladding layer 230). Each of the core and cladding materials may include the optically active material of the waveguide. For example, in one embodiment, only the cladding material is optically active (i.e., layer 230 is an electro-optical material). In another embodiment, both the waveguide core and cladding layer are formed from optically active material. In another embodiment, only the waveguide core is optically active.

Optical device 200 further includes a multi-segment optical waveguide including segments 211 and 212, connected via bend 220. Said bend may comprise any bend tightly confined so that light may not escape. In this embodiment, segment 211 is positioned between electrodes 201 and 202, while segment 212 is positioned between electrodes 202 and 203 (with a space or gap between said segments and said electrodes, so that propagating light will not interact with the electrodes themselves); therefore, segments 211 and 212 are relatively parallel with each other.

Optical device 200 may comprise, for example, a phase shifter to perform phase shifting modulation. Thus, when light propagates through optical waveguide segment 211 and an electrical difference (e.g., a voltage) is applied to electrodes 201 and 202, the refractive index of the optically active material comprising optical waveguide segment 211 changes, resulting in a phase change in the light propagating through said segment. It is to be understood that the same electrical voltage may be applied to waveguide segment 212 via electrodes 202 and 203 to produce the same electro-optic effect. It is to be further understood that in this embodiment, because none of the plurality of electrodes interface with bend 220, there is no electro-optic effect produced in this portion of the multi-segment waveguide.

It is to be understood that if each waveguide segment has a length of L, then the multi-segment optical waveguide of device 200 has a length of approximately 2L—i.e., the length of both waveguide segments. The overall length of device 200 is approximately L. Furthermore, electrode 202 is "shared" between optical waveguide segments 211 and 212, thereby reducing the capacitance and the power consumed by device 200.

Device 250 includes a multi-segment optical waveguide that is folded over itself three times (i.e., the device is similar to device 200, except it further includes waveguide segment 213, bend 225 and electrode 204). Thus, the multi-segment optical waveguide of device 250 has a length of approximately 3L, while the overall length of device 250 is approximately L. Furthermore, device 250 has an effective electrode length of 2L (i.e., device 250 has complimentary electrodes each totaling 2L in length) thereby having a reduced capacitance and power requirement compared to a prior art phase shifter with a waveguide length of 3L (i.e., a device including a single segment optical waveguide would similarly require complimentary electrodes each totaling 3L in length).

Figure 3A:
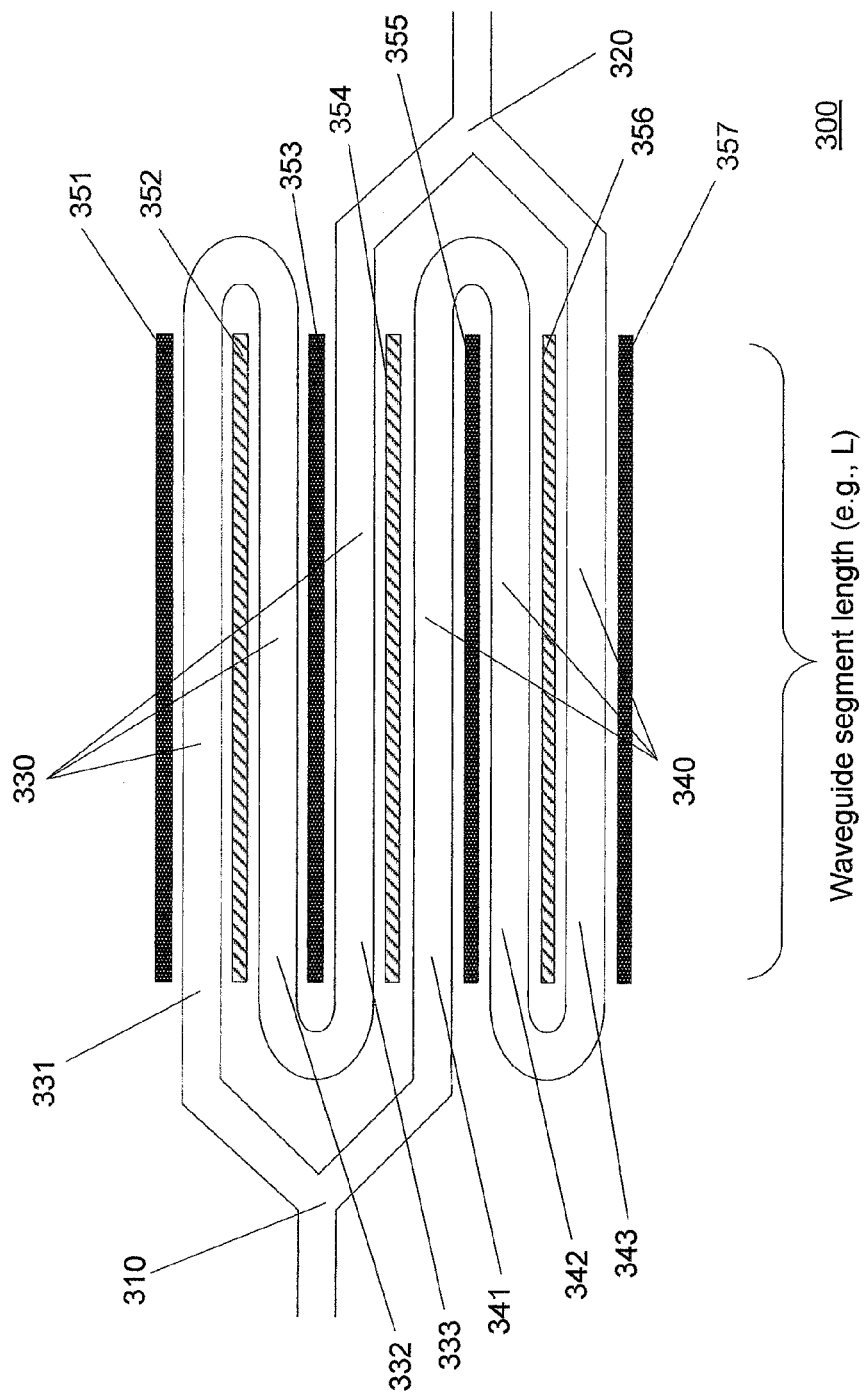
FIG. 3A is a diagram of a Mach-Zehnder Interferometer utilizing an embodiment of the invention.

FIG. 3A is a diagram of a Mach-Zehnder Interferometer (MZI) utilizing an embodiment of the invention. In this embodiment, similar to prior art MZI 100 of FIG. 1, MZI 300 includes optical waveguide splitter 310, optical waveguide re-combiner 320, and two waveguide "branches" 330 and 340; however, in this embodiment, each waveguide branch comprises a three-fold multi-segment optical waveguide, similar to the optical waveguide of device 250 of FIG. 2 (thus, multi-segment optical waveguide branch 330 includes optical waveguide segments 331, 332 and 333, while multi-segment optical waveguide branch 340 includes optical waveguide segments 341, 342 and 343).

MZI 300 further includes electrodes 351-357. It is to be understood that said electrodes are "shared" between optical waveguide segments, thereby reducing the effective capacitance and the power consumed by MZI 300 (i.e., a voltage applied to electrodes 351 and 352 changes the refractive index of optical waveguide segment 331; 352/353 changes the refractive index of segment 332; 353/354 changes the refractive index of segment 333; 354/355 changes the refractive index of segment 341; 355/356 changes the refractive index of segment 342; and 356/357 changes the refractive index of segment 343).

Thus, in this embodiment MZI 300 includes optical waveguide branches with lengths of approximately 3L, while having a device length of approximately L. It is to be understood that in this embodiment, the length of the electrodes of MZI 300 (i.e., L) are shorter than the electrical signal wavelength (i.e., 3L); thus, electrodes 351-357 are more likely to behave as lump electrodes, rather than traveling wave electrodes. It is further understood that the number of folds in the device may be increased beyond the folds depicted in MZI 300, so that the electrodes are short enough to behave as lump electrodes.

Figure 3B:
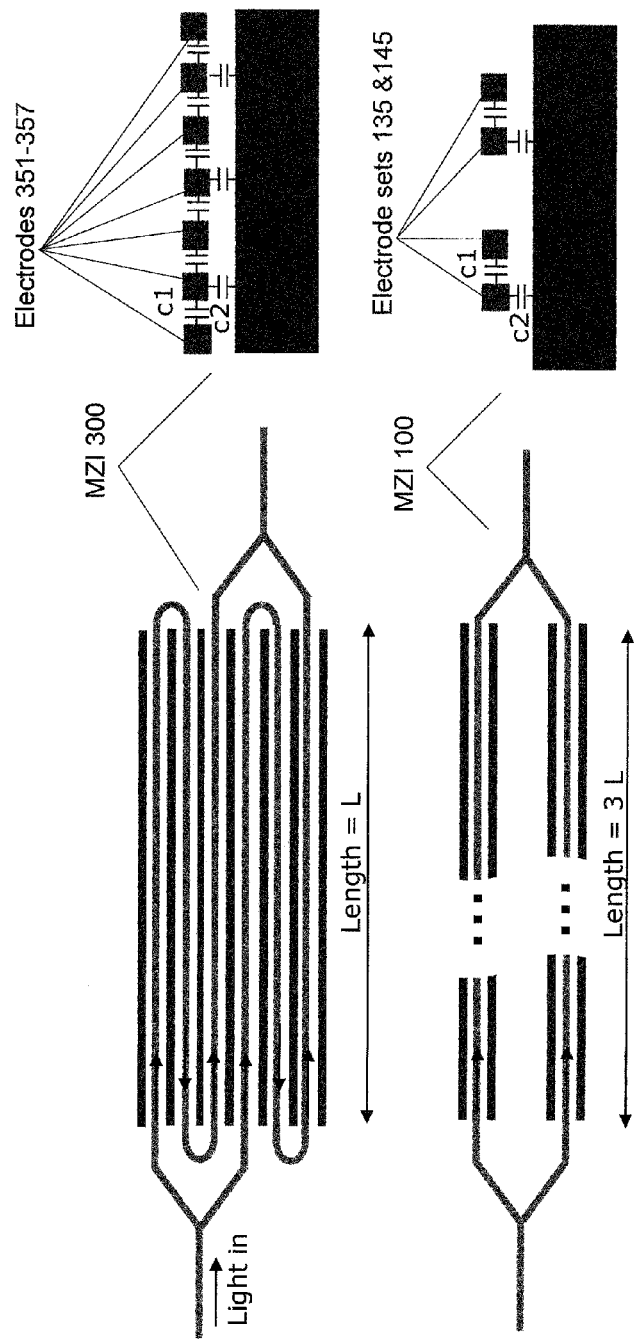
FIG. 3B is a diagram illustrating capacitance characteristics of an embodiment of the invention compared to the prior art.

FIG. 3B is a diagram illustrating capacitance characteristics of an embodiment of the invention compared to the prior art. In this diagram, representations of MZI 300 and MZI 100 (i.e., prior art) are shown. It is understood that the power requirement of modulators increases linearly with increasing capacitance. Thus it is to be understood that, embodiments of the invention reduce the power requirement of modulators of a given length due to the folded multi-segment optical waveguide and shared electrode structure.

Assuming both MZI 300 and MZI 100 comprise the same waveguide length (e.g., 3L), as described above and shown in table 390, MZI 300 will have a shorter device length (L) compared to prior art MZI 100 (3L). Furthermore, due to the reduced electrode length resulting from the folded multi-segment optical waveguide, MZI 300 has an effective capacitance of 6C1+3C2 per waveguide segment length (L), while MZI 100 has an effective capacitance of 2C1+2C2 per waveguide length (3L). Therefore, as shown in table 390, the effective capacitance of MZI 300 is 6C1(L)+3C2(L), while the effective capacitance of MZI 100 is 6C1(L)+6C2(L), meaning the capacitance of MZI 300 is 3C2(L) less than the capacitance of MZI 100. It is to be understood that the difference in effective capacitance from prior art MZIs may be greater in other embodiments of the invention wherein said optical waveguides are folded onto themselves more than three times. Capacitance C2 is a parasitic capacitance that can also be decreased by a variety of techniques known to those skilled in the art. It is expected that C2 can be made significantly smaller than C1.

It is to be understood that due to its shorter electrode length, MZI 300 is more likely to not require traveling wave electrodes for high frequency performance. Because the electrodes are sufficiently shorter than the optical waveguide (i.e., L compared to 3L), said electrodes may behave as lump elements. It is understood that the number of folds in the device may be increased beyond the folds depicted in MZI 300, so that the electrodes are short enough to behave as lump electrodes. It is to be further understood that eliminating the need for traveling-wave electrodes reduces the power requirement of the device. When electrode length exceeds the lump-electrode condition, the electrodes need to be of the travelling wave type, which require a resistive termination (e.g. 50

Ohms), known to incur a high power penalty (and thus embodiments of the invention may eliminate this power penalty). It is to be further understood that embodiments of the invention may also reduce the design and process complexity of the device, making said devices easier to manufacture and more suitable for mass production.

Figure 4:
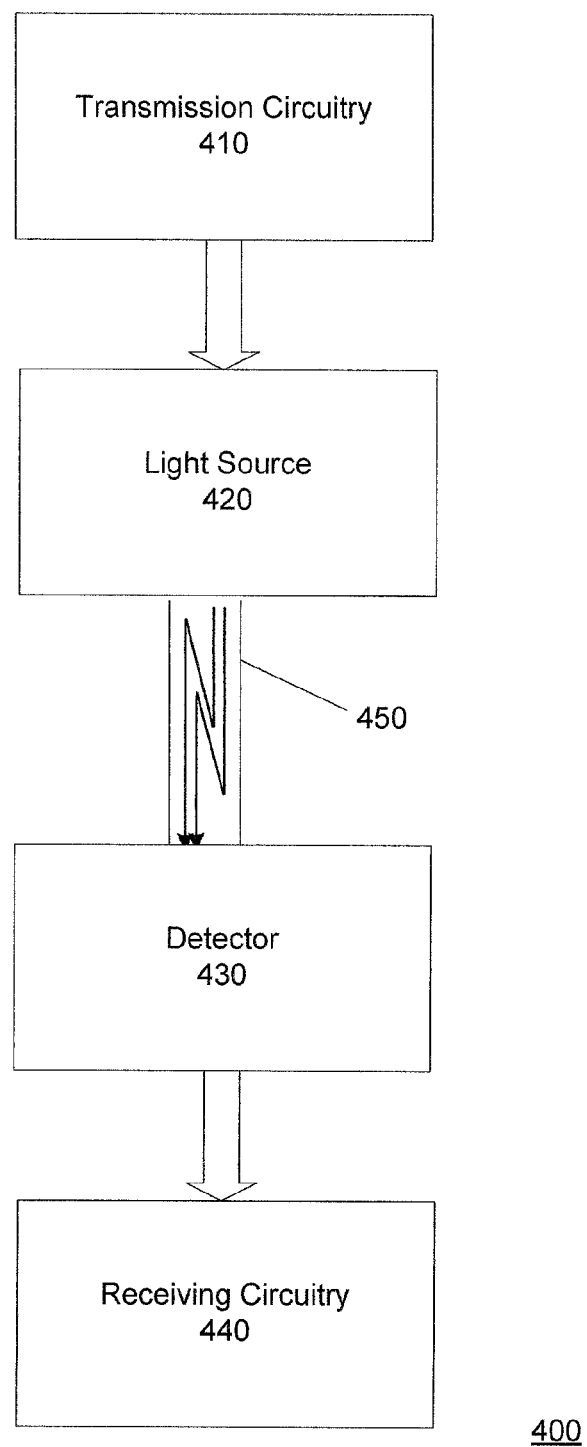
FIG. 4 is a block diagram of an optical communications system that may utilize an embodiment of the invention.

FIG. 4 is a block diagram of a simplified optical telecommunications system utilizing an embodiment of the invention. System 400 includes transmission circuitry 410, light source 420, detector 430 and receiving circuitry 440. Light source 420 may transmit optical signals to detector 430 via transmission medium 450, which may comprise any functional optical transmission medium known in the art (e.g., fiber optic medium).

Receiving circuitry 440 may include any modulator having multi-segment optical waveguides according to any of the embodiments described above. Said modulator may perform either amplitude (i.e., intensity) or phase modulation on the light received from light source 420.

Figure 5:
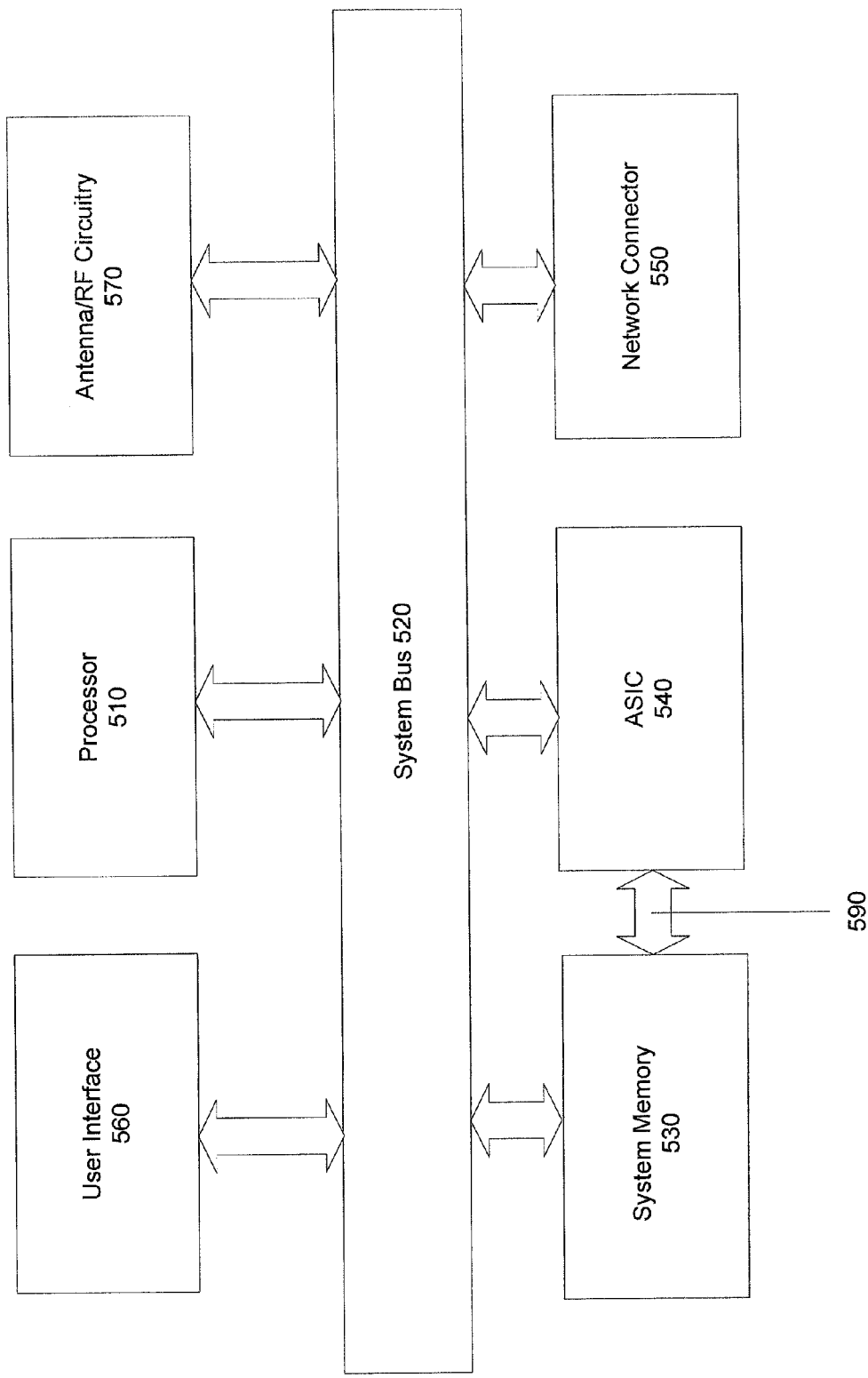
FIG. 5 is block diagram of a computing system that may utilize an embodiment of the invention.

FIG. 5 is block diagram of a system that may utilize an embodiment of the invention. System 500 may be included in, for example, a desktop computer, a laptop computer, a tablet computer, a netbook, a notebook computer, a personal digital assistant (PDA), a server, a workstation, a cellular telephone, a mobile computing device, an Internet appliance or any other type of computing device.

System 500 may include processor 510 to exchange data, via system bus 520, with user interface 560, system memory 530, Application Specific Integrated Circuit (ASIC) 540 and network connector 550. System memory 530 and ASIC 540 may further exchange data utilizing optical chip-to-chip connection 590, which may utilize a modulator including an optical waveguide according to any embodiment of the invention. It is to be understood that chip-to-chip connection 590 is shown to be between system memory 530 and ASIC 540 as an example only, and chip-to-chip connections utilizing optical waveguide structures according to embodiments of the invention may be used by any chip in a computing system. Furthermore, computing systems may utilize embodiments of the invention in optical data transmissions other than chip-to-chip connections (e.g., board-to-board connections, system data input/output).

System 500 may further include antenna and RF circuitry 570 to send and receive signals to be processed by the various elements of system 500. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 500 may include multiple physical antennas.

While shown to be separate from network connector 550, it is to be understood that in other embodiments, antenna and RF circuitry 570 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

It is noted that terms like "preferably," "commonly," and "typically" are not utilized above to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. Many modifications may be made to adapt the teachings of the present invention to a particular situation without departing from the scope thereof.

The invention claimed is:

1. An apparatus comprising
a plurality of electrodes including a first electrode, a second electrode complementary to the first electrode, and a third electrode complimentary to the second electrode, each of the plurality of electrodes aligned relatively parallel to each other; and
a multi-segment optical waveguide including optically active material and comprising a first segment positioned between the first and second electrodes, and a second segment positioned between the second and third electrodes, the second segment to receive light from the first segment and to propagate the light received from the first segment between the second and third electrodes;
the refractive index of the optically active material of the first segment to change based on an electrical difference applied to the first and second electrodes, and the refractive index of the optically active material of the second segment to change based on an electrical difference applied to the second and third electrodes;
wherein the plurality of electrodes further comprises a fourth electrode complementary to the third electrode, the multi-segment optical waveguide further comprising a third segment, to receive light from the second segment, positioned between the third and fourth electrodes, the refractive index of the optically active material of the third segment to change based on an electrical difference applied to the third and fourth electrodes.

2. The apparatus of claim 1, wherein the plurality of electrodes and the multi-segment optical waveguide comprise a first branch, the apparatus further comprising:
a second branch including a second multi-segment optical waveguide and a second plurality of electrodes, the second multi-segment optical waveguide to include a segment positioned on the side of the fourth electrode opposite the third segment of the multi-segment optical waveguide;
an input optical waveguide splitter coupled to the first and second branches; and an output waveguide re-combiner coupled to the first and second branches.

3. The apparatus of claim 2, wherein each of the plurality of electrodes is shorter than the first and second multi-segment optical waveguides so as to behave as lump elements.

4. The apparatus of claim 1, wherein the optically active material of each of the first and second segments of the multi-segment optical waveguide comprise n-implant and p-implant Si regions, and the electrical difference applied to the electrodes to comprise a voltage.

5. The apparatus of claim 1, wherein the optically-active material of the multi-segment optical waveguide comprises an electro-optical polymer (EOP), ferroelectric oxide, a piezoelectric material, a III-V electro-absorption material, or a Germanium electro-absorption material.

6. A system comprising:
a light source;
a modulator including
a plurality of electrodes including a first electrode, a second electrode complementary to the first electrode, and a third electrode complimentary to the second electrode, each of the plurality of electrodes aligned relatively parallel to each other, and
a multi-segment optical waveguide including optically active material and comprising a first segment positioned between the first and second electrodes, and a second segment positioned between the second and third electrodes, the second segment to receive light from the first segment and to propagate the light received from the first segment between the second and third electrodes, the refractive index of the optically active material of the first segment to change based on an electrical difference applied to the first and second electrodes, and the refractive index of the optically active material of the second segment to change based on an electrical difference applied to the second and third electrodes, wherein the plurality of electrodes of the modulator further comprises a fourth electrode complementary to the third electrode, the multi-segment optical waveguide further comprising a third segment, to receive light from the second segment, positioned between the third and fourth electrodes, the refractive index of the optically active material of the third segment to change based on an electrical difference applied to the third and fourth electrodes; and
a transmission medium, the light source to transmit light to the modulator via the transmission medium.

7. The system of claim 6, wherein the plurality of electrodes and the multi-segment optical waveguide of the modulator comprise a first branch, the modulator further comprising:
a second branch including a second multi-segment optical waveguide and a second plurality of electrodes, the second multi-segment optical waveguide to include a segment positioned on the side of the fourth electrode opposite the third segment of the multi-segment optical waveguide;
an input optical waveguide splitter coupled to the first and second branches; and
an output waveguide re-combiner coupled to the first and second branches.

8. The system of claim 7, wherein each of the plurality of electrodes of the modulator is shorter than the first and second multi-segment optical waveguides so as to behave as lump elements.

9. The system of claim 6, wherein the optically active material of each of the first and second segments of the multi-segment optical waveguide comprise n-implant and p-implant Si regions, and the electrical difference applied to the electrodes to comprise a voltage.

10. The system of claim 6, wherein the optically-active material of the multi-segment optical waveguide comprises an electro-optical polymer (EOP), ferroelectric oxide, a piezoelectric material, a III-V electro-absorption material, or a Germanium electro-absorption material.

11. A system comprising:
a processor;
a memory; and
an integrated circuit (IC), the IC and at least one of the processor and the memory to exchange data via a chip-to-chip optical interface, the chip-to-chip optical interface to include a modulator comprising
a plurality of electrodes including a first electrode, a second electrode complementary to the first electrode, and a third electrode complimentary to the second electrode, each of the plurality of electrodes aligned relatively parallel to each other, and
a multi-segment optical waveguide including optically active material and comprising a first segment positioned between the first and second electrodes, and a second segment positioned between the second and third electrodes, the second segment to receive light from the first segment and to propagate the light received from the first segment between the second and third electrodes, the refractive index of the optically active material of the first segment to change based on an electrical difference applied to the first and second electrodes, and the refractive index of the optically active material of the second segment to change based on an electrical difference applied to the and third electrodes, wherein the plurality of electrodes of the modulator further comprises a fourth electrode complementary to the third electrode, the multi-segment optical waveguide further comprising a third segment, to receive light from the second segment, positioned between the third and fourth electrodes, the refractive index of the optically active material of the third segment to change based on an electrical difference applied to the third and fourth electrodes.

12. The system of claim 11, wherein the plurality of electrodes and the multi-segment optical waveguide of the modulator comprise a first branch, the modulator further comprising:
a second branch including a second multi-segment optical waveguide and a second plurality of electrodes, the second multi-segment optical waveguide to include a segment positioned on the side of the fourth electrode opposite the third segment of the multi-segment optical waveguide;
an input optical waveguide splitter coupled to the first and second branches; and
an output waveguide re-combiner coupled to the first and second branches.

13. The system of claim 12, wherein each of the plurality of electrodes of the modulator is shorter than the first and second multi-segment optical waveguides so as to behave as lump elements.

14. The system of claim 11, wherein the optically active material of each of the first and second segments of the multi-segment optical waveguide comprise n-implant and p-implant Si regions, and the electrical difference applied to the electrodes to comprise a voltage.

15. The system of claim 11, wherein the optically-active material of the multi-segment waveguide comprises an electro-optical polymer (EOP), ferroelectric oxide, a piezoelectric material, a III-V electro-absorption material, or a Germanium electro-absorption material.

16. The system of claim 11, further comprising:
an antenna; and
radio frequency circuitry coupled to the antenna to receive signal data to be stored in the memory.

* * * * *